United States Patent
Kawano et al.

(10) Patent No.: US 10,793,024 B2
(45) Date of Patent: Oct. 6, 2020

(54) SEAT AND SEAT CONTROL SYSTEM

(71) Applicant: TOYOTA BOSHOKU KABUSHIKI KAISHA, Aichi (JP)

(72) Inventors: Kenji Kawano, Aichi (JP); Yoshiomi Nishigaki, Aichi (JP); Kazumi Inoue, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 77 days.

(21) Appl. No.: 16/158,770

(22) Filed: Oct. 12, 2018

(65) Prior Publication Data
US 2019/0118673 A1    Apr. 25, 2019

(30) Foreign Application Priority Data

Oct. 23, 2017  (JP) .................................. 2017-204435

(51) Int. Cl.
*B60N 2/02* (2006.01)
*B60N 2/56* (2006.01)
*B60N 2/00* (2006.01)

(52) U.S. Cl.
CPC ........... *B60N 2/0248* (2013.01); *B60N 2/002* (2013.01); *B60N 2/56* (2013.01); *B60N 2002/0268* (2013.01)

(58) Field of Classification Search
CPC ........ B60N 2/0248; B60N 2/002; B60N 2/56; B60N 2002/0268; B60N 2/0244
See application file for complete search history.

(56) References Cited

U.S. PATENT DOCUMENTS

| | | | |
|---|---|---|---|
| 9,808,084 B2 | 11/2017 | Di Censo et al. | |
| 2012/0053794 A1* | 3/2012 | Alcazar | B60N 2/0244 701/48 |
| 2015/0366350 A1 | 12/2015 | Di Censo et al. | |
| 2018/0014754 A1* | 1/2018 | Gray | A61B 5/1036 |
| 2020/0046261 A1* | 2/2020 | Rustamova | A61B 5/1116 |

FOREIGN PATENT DOCUMENTS

| | | | |
|---|---|---|---|
| CN | 103919387 A | * | 7/2014 |
| CN | 106994915 A | * | 8/2017 |
| JP | 11064131 A | * | 3/1999 |
| JP | 11300053 A | * | 11/1999 |
| JP | 2016-2456 | | 1/2016 |

* cited by examiner

*Primary Examiner* — Thomas C Lee
*Assistant Examiner* — Michael Tang
(74) *Attorney, Agent, or Firm* — Greenblum & Bernstein, P.L.C.

(57) ABSTRACT

Provided is a seat in which a physical quantity can be controlled according to a physique of an occupant. One aspect of the present disclosure provides a seat including a seat body that supports a body of an occupant, at least one driving device that changes a physical quantity of the seat body, and a controller that controls the at least one driving device. The controller includes a model generator that generates a human body model of the occupant, an analyzer that analyzes a state quantity of the human body model, and an instructing device that drives the at least one driving device based on a result of an analysis by the analyzer.

8 Claims, 2 Drawing Sheets

SEAT AND SEAT CONTROL SYSTEM

CROSS-REFERENCE TO RELATED APPLICATIONS

The present disclosure claims the benefit of Japanese Patent Application No. 2017-204435 filed on Oct. 23, 2017 with the Japan Patent Office, the entire disclosure of which is incorporated herein by reference.

BACKGROUND

The present disclosure relates to a seat and a seat control system.

Among seats for persons to be seated, some of the seats comprise mechanisms that adjust physical quantities such as the arrangement, and the temperature of the seats. An occupant of such a seat perceives the occupant's own state and controls an actuator and so on.

In the case where the occupant adjusts the seat as mentioned above, the adjustment is not necessarily done optimally, since the optimality largely depends on the physical sense of the occupant.

Japanese Patent Application Publication No. 2016-2456, for example, discloses a system comprising sensors that detect the state of an occupant, and the system controls an actuator and so on based an output from the sensors.

SUMMARY

Comfortable arrangement and temperature distribution are different depending on the physique of the occupant. In the case of the aforementioned system that performs control based on the output of the sensors, the control is performed in a uniform manner irrespective of the physique of the occupant. This makes the control accuracy low.

It is preferable that one aspect of the present disclosure provides a seat that can control the physical quantity of the seat according to the physique of the occupant.

One aspect of the present disclosure provides a seat comprising a seat body that supports a body of an occupant, at least one driving device that changes a physical quantity of the seat body, and a controller that controls the at least one driving device. The controller comprises a model generator that generates a human body model of the occupant, an analyzer that analyzes a state quantity of the human body model, and an instructing device that drives the at least one driving device based on a result of an analysis by the analyzer.

Due to this configuration, the human body model that is unique to the occupant is generated and analyzed. Accordingly, the physical quantity of the seat body can be automatically adjusted such that the occupant feels comfortable. In other words, the physical quantity can be optimally controlled according to the physique of the occupant.

In one aspect of the present disclosure, the controller may further comprise a display that shows the state quantity of the human body model. Due to this configuration, the state quantity of the human body model after the physical quantity is controlled is shown. Accordingly, the occupant can visually, in addition to physically, recognize the change in the physical quantity made by the control.

In one aspect of the present disclosure, the controller may further comprise a memory that stores a change in the state quantity of the human body model. Due to this configuration, reference is made to the history of the change in the state quantity that is produced corresponding to the control of the physical quantity, and thus an evaluation of the control can be made independently from a personal view (that is, sensitivity) of the occupant. As a result, the advantage of the seat can be shared with other people.

In one aspect of the present disclosure, the at least one driving device may be multiple driving devices each of which changes the physical quantity different from each other. Moreover, the instructing device may drive the multiple driving devices based on a single human body model that is identical to the human body model. Due to this configuration, the multiple physical quantities can be simultaneously controlled based on the same human body model, and the comfortableness of the seat can be optimized to a higher degree.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENTS

1. First Embodiment

1-1. Configuration

Figure 1:
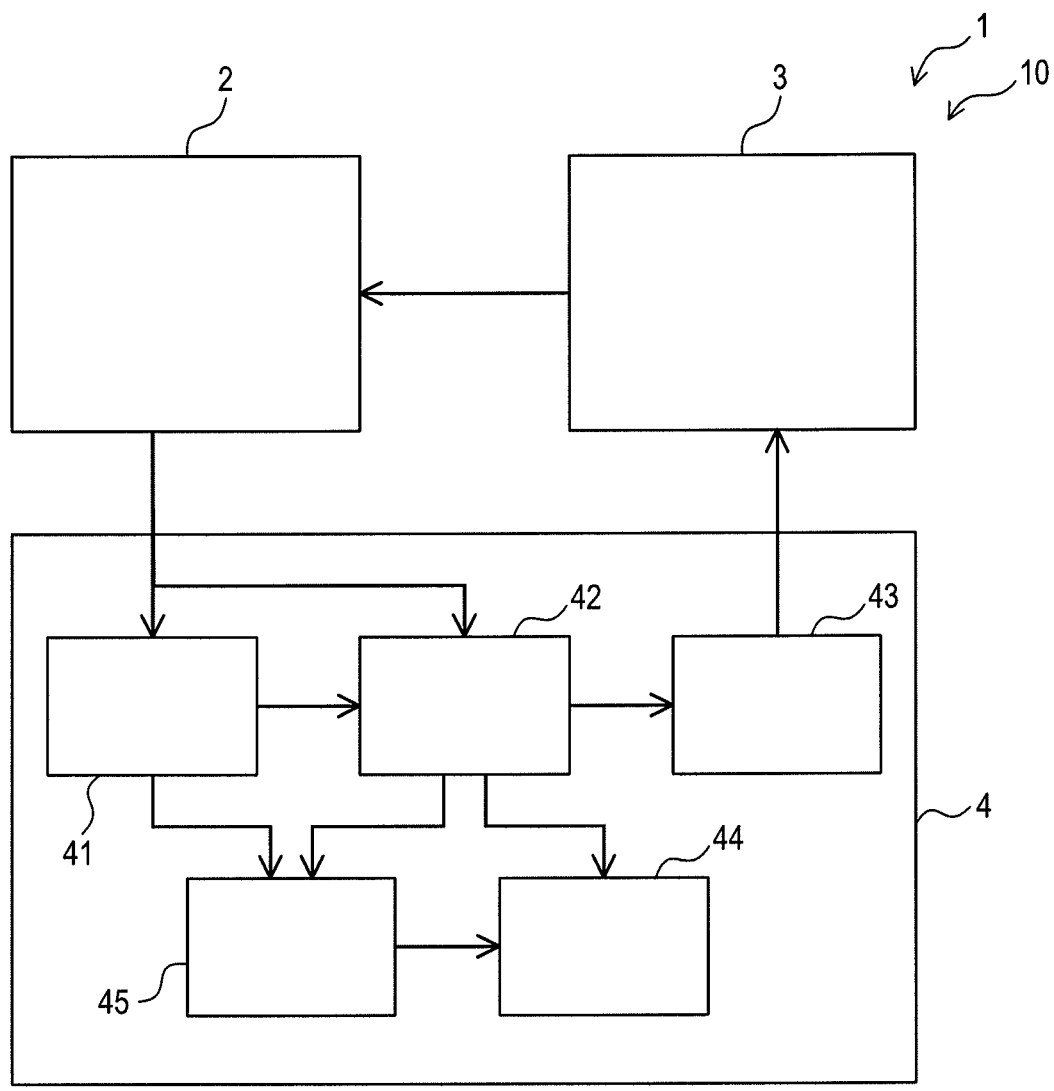
FIG. 1 is a schematic block diagram showing a seat according to an embodiment.

A seat 1 (or a seat control system 10) shown in FIG. 1 comprises a seat body 2, at least one driving device 3, and a controller 4. The seat 1 (or the seat control system 10) is to be installed in a vehicle or a building.

<Seat Body>

Figure 2:
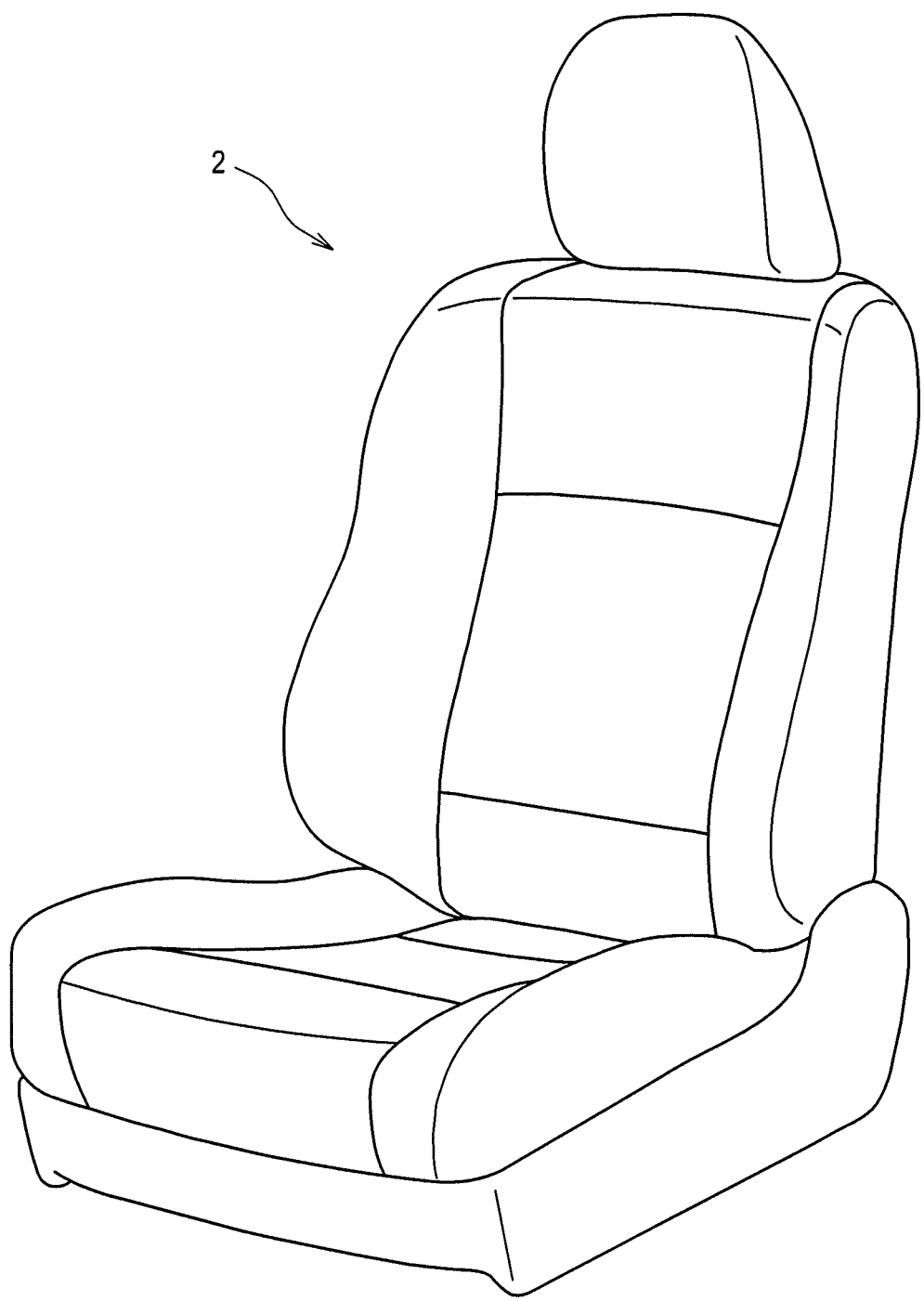
FIG. 2 is a schematic perspective view showing a seat body of the seat shown in FIG. 1.

As shown in FIG. 2, the seat body 2 supports the body of an occupant. FIG. 2 shows one example of the seat body 2 installed in a vehicle. Various sensors (not shown) that measure the state of the occupant are attached to the seat body 2.

<Driving Device>

The driving device 3 is configured to change a physical quantity of the seat body 2. The driving device 3 is attached to the seat body 2 or disposed around the seat body 2.

The "physical quantity" in the present disclosure means mechanically or electrically variable amounts. Specifically, the "physical quantity" includes the position and the arrangement of each portion of the seat body 2, a reaction force, such as a surface force and a hardness, of each portion of the seat body 2, a temperature distribution in each portion of the seat body 2, and sound around the seat body 2.

An example of the driving device 3 includes an actuator that changes the position or the arrangement of the entire or a portion of the seat body 2, a seat heater that changes the temperature distribution in the seat body 2, and a sound system that changes a sound setting of the seat body 2.

The seat 1 (or the seat control system 10) may comprise a single driving device 3, or multiple driving devices 3 each of which changes a different physical quantity from each other. Providing multiple driving devices 3 enables, for example, simultaneous adjustment to the arrangement of the seat body 2 and the temperature distribution in the seat body 2.

<Controller>

The controller 4 is configured to control the driving device 3. As shown in FIG. 1, the controller 4 comprises a model generator 41, an analyzer 42, an instructing device 43, a display 44, and a memory 45.

<<Model Generator>>

The model generator 41 generates a human body model of the occupant. The human body model means a reproduction of the entire or a partial human body in a three-dimensional space. The human body model can be generated by a known software. The model generator 41 generates the human body model according to the physique of the occupant. In other words, the human body model is generated in the controller 4 so as to be equivalent to the occupant.

The human body model is generated, for example, by estimating the physique based on the output from the sensors attached to the seat body 2. For example, in the case of a vehicle seat, the body size of the occupant is estimated based on the slide position of the seat body 2, and the weight of the occupant is estimated based on an output from a load sensor of a seat cushion in order to statistically generate the human body model.

Alternatively, the human body model may be generated in response to an input by a user that is not necessarily the occupant. The human body model may be also generated by a combination of estimation based on the output from the sensors and the input by the user.

The model generator 41 may be configured to generate the human body model for the occupant whose human body model has been already generated by reading data of the human body model that has been already stored in the memory 45, which will be described below. The model generator 41 may also regularly update the already-generated human body model based on the output from the sensors.

<<Analyzer>>

The analyzer 42 recognizes the surrounding environment of the human body model generated by the model generator 41, and to analyze a state quantity of the human body model.

The "state quantity of the human body model" means physical numerical values obtained by analyzing the human body model (in other words, physical numerical values that can be represented by mathematical formulae). Specifically, the "state quantity of the human body model" includes, for example, the position and the posture of the human body model, the reaction force received from the seat body 2, the internal force of the human body model, and the temperature distribution in the human body model. According to an advanced analysis, a psychological model (for example, the expression of a face) can be also included in the state quantity of the human body model.

For example, in the case of a vehicle seat, the analyzer 42 estimates the buttocks position of the occupant using a pressure sensor of the seat cushion and the compression property of the seat cushion that is a known value, and determines the seating position of the occupant in a cabin of the vehicle. In this case, pressure sensors may be disposed, for example, in the back surface portion and the thigh portion to increase the number of the measuring points so that the positional accuracy can be improved. Moreover, measuring the positions of the head, hands, and feet of the occupant with position sensors, such as non-contact sensors, can improve the positional accuracy.

The analyzer 42 analyzes the state quantity of the human body model after the human body model is generated and after the driving device 3 is driven in response to an instruction from the instructing device 43 (that is, after the physical quantity is controlled), which will be described below. Accordingly, a closed loop is formed in the controller 4. The analysis 42 by the analyzer is not limited to after the physical quantity being controlled. The analyzer 42 may be configured to analyze the state quantity on a regular basis.

<<Instructing Device>>

The instructing device 43 drives the driving device 3 based on the result of the analysis by the analyzer 42. Specifically, the instructing device 43 determines the control amount of the driving device 3 based on the state quantity of the human body model obtained by the analyzer 42, and outputs drive signals corresponding to the control amount to the driving device 3. In the instructing device 43, the relation between the state quantity of the human body model and the physical quantity of the seat body 2, which is the control target, is mapped.

For example, the instructing device 43 drives the driving device 3 based on the position of the human body model determined by the analyzer 42 so as to change the contact area between the human body model and the seat body 2. Specifically, the instructing device 43 drives a seat adjusting mechanism to increase the contact area so that the human body model further fits into the seat body 2.

In a case where the seat 1 (or the seat control system 10) comprises multiple driving devices 3, the instructing device 43 may drive the multiple driving devices 3 based on the same human body mode. Accordingly, the arrangement, and the temperature distribution, for example, can be simultaneously controlled and the comfortableness of the seat to the occupant can be optimized to a higher degree.

<<Display>>

The display 44 shows the state quantity of the human body model. The display 44 shows, for example, the contact area between the human body model and the seat body 2 that has been changed by driving of the driving device 3 on a device, such as a monitor.

The display 44 may show only the state quantity after the physical quantity of the seat body 2 is controlled (that is, the current state quantity). Alternatively, the display 44 may simultaneously show the state quantities before and after the control, or may show the difference in the state quantities between before and after the control as described above.

<<Memory>>

The memory 45 stores the change in the state quantity of the human body model. For example, the memory 45 saves the history of the contact area between the human body model and the seat body 2 as data. The saved data is shown, for example, on the display 44 in response to operation by the user, and can be also outputted to a device, such as a mobile terminal device.

Instead of the state quantity such as the posture and the temperature of the human body model, the memory 45 may store a parameter indicating the change in the state quantity. For example, the change in the posture may be stored as the amount of calorie consumed by the change in the posture.

The memory 45 also stores the data of the human body model generated by the model generator 41. The stored data of the human body model is called up in response to operation by the user, and used by the analyzer 42.

[1-2. Effects]

According to the embodiment described above in detail, the following effects can be achieved.

(1a) Since the human body model that is unique to the occupant is generated and analyzed, the physical quantity of the seat body 2 can be automatically adjusted such that the occupant feels comfortable. In other words, the physical quantity can be optimally controlled according to the physique of the occupant.

(1b) Since the state quantity of the human body model after the physical quantity is controlled is shown, the occupant can visually, in addition to physically, recognize the change in the physical quantity made by the control.

(1c) Since reference is made to the history of the change in the state quantity that is produced corresponding to the control of the physical quantity, an evaluation of the control can be made independently from a personal view (that is, sensitivity) of the occupant. Consequently, the optimization that the occupant has experienced can be shared with other people as the advantage of the seat 1 (or the seat control system 10).

2. Other Embodiment

The above has described the embodiment according to the present disclosure. However, it goes without saying that the present disclosure is not limited to the aforementioned embodiment and may be embodied in various forms.

(2a) In the seat 1 (or the seat control system 10) according to the aforementioned embodiment, the display 44 and the memory 45 are not essential components. In other words, the controller 4 does not have to be provided with the display 44 and the memory 45.

(2b) It may be possible to divide a function of one element in the above-described embodiment to a plurality of elements, or to integrate functions of a plurality of elements into one element. The configurations in the above-described embodiments may be partly omitted. At least part of the configuration of the above-described embodiments may be added to or replaced with the configuration of other embodiments described above. Any form that falls within the scope of the technical idea defined by the language of the appended claims may be an embodiment of the present disclosure.

What is claimed is:

1. A seat comprising:
    a seat body that supports a body of an occupant;
    at least one driving device that changes a physical quantity of the seat body;
    a controller that controls the at least one driving device; and
    a plurality of sensors that measure a state of the occupant sitting on the seat body,
    wherein the controller comprises:
        a model generator that generates a human body model of the occupant based on output from the plurality of sensors;
        an analyzer that analyzes a state quantity of the human body model;
        an instructing device that drives the at least one driving device based on a result of an analysis by the analyzer; and
        a display that shows a change in the state quantity caused by driving the at least one driving device,
    wherein the analyzer analyzes the state quantity after the human body model is generated and after the at least one driving device is driven.

2. The seat according to claim 1, wherein the controller further comprises a display that shows the state quantity of the human body model.

3. The seat according to claim 1,
    wherein the at least one driving device is multiple driving devices each of which is configured to change the physical quantity different from each other, and
    wherein the instructing device drives the multiple driving devices based on a single human body model that is identical to the human body model.

4. The seat according to claim 1, wherein the at least one driving device is a heater or a sound system.

5. The seat according to claim 1, wherein the state quantity includes temperature distribution in the human body model, or a psychological model.

6. A seat control system comprising:
    a seat body that supports a body of an occupant;
    at least one driving device that changes a physical quantity of the seat body;
    a controller that controls the at least one driving device; and
    a plurality of sensors that measure a state of the occupant sitting on the seat body,
    wherein the controller comprises:
        a model generator that generates a human body model of the occupant based on output from the plurality of sensors;
        an analyzer that analyzes a state quantity of the human body model;
        an instructing device that drives the at least one driving device based on a result of an analysis by the analyzer; and
        a display that shows a change in the state quantity caused by driving the at least one driving device,
    wherein the analyzer analyzes the state quantity after the human body model is generated and after the at least one driving device is driven.

7. The seat control system according to claim 6, wherein the at least one driving device is a heater or a sound system.

8. The seat control system according to claim 6, wherein the state quantity includes temperature distribution in the human body model, or a psychological model.

* * * * *